(12) United States Patent
Hopson et al.

(10) Patent No.: US 7,607,984 B2
(45) Date of Patent: Oct. 27, 2009

(54) DEVICE TO LIMIT THE AMOUNT OF ANGULAR DISPLACEMENT IN BALL-TYPE FIXED CV JOINTS

(75) Inventors: Michael W. Hopson, Clinton Township, MI (US); Richard L. Seidel, Macomb, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 1877 days.

(21) Appl. No.: 10/201,757

(22) Filed: Jul. 23, 2002

(65) Prior Publication Data

US 2002/0187842 A1    Dec. 12, 2002

Related U.S. Application Data

(63) Continuation-in-part of application No. 09/693,302, filed on Oct. 20, 2000, now abandoned.

(51) Int. Cl.
*F16D 3/00* (2006.01)
(52) U.S. Cl. .................. 464/145; 464/146; 464/906
(58) Field of Classification Search .............. 464/144, 464/145, 146, 906; 384/515
See application file for complete search history.

(56) References Cited

U.S. PATENT DOCUMENTS 3,396,554 A    8/1968    Westercamp
4,325,232 A *  4/1982    Girguis ................... 464/144
5,632,683 A    5/1997    Fukumura et al.
5,779,551 A    7/1998    Stall et al.
6,171,196 B1   1/2001    Welschof
6,227,979 B1 * 5/2001    Yamamoto et al. .......... 464/145
6,280,338 B1 * 8/2001    Hayama et al. ............. 464/146
6,332,844 B1 * 12/2001   Hayama et al. ............. 464/145
6,530,843 B2 * 3/2003    Miller et al. .............. 464/145

FOREIGN PATENT DOCUMENTS

| FR | 2 775 502 A    | 9/1999 |
| GB | 2 271 162 A    | 4/1994 |
| GB | 2 346 671 A    | 8/2000 |
| JP | 0 800 40005 A  | 2/1996 |

* cited by examiner

*Primary Examiner*—Aaron M Dunwoody
(74) *Attorney, Agent, or Firm*—MacMillan, Sobanski & Todd, LLC; Steven W. Hays

(57) ABSTRACT

An angle-limiting ring coupled to an interconnecting shaft of a driving axle coupled to a fixed ball type outer constant velocity joint. The angle-limiting ring prevents the overarticulation of the joint at any time when the driving axle is not fully assembled into a rear wheel drive system. This prevents the loss of the ball bearings contained within the joint associated with this overarticulation. A snap ring may also be installed on the interconnecting shaft that allows the positive retention of the interconnecting shaft into the inner race.

22 Claims, 2 Drawing Sheets

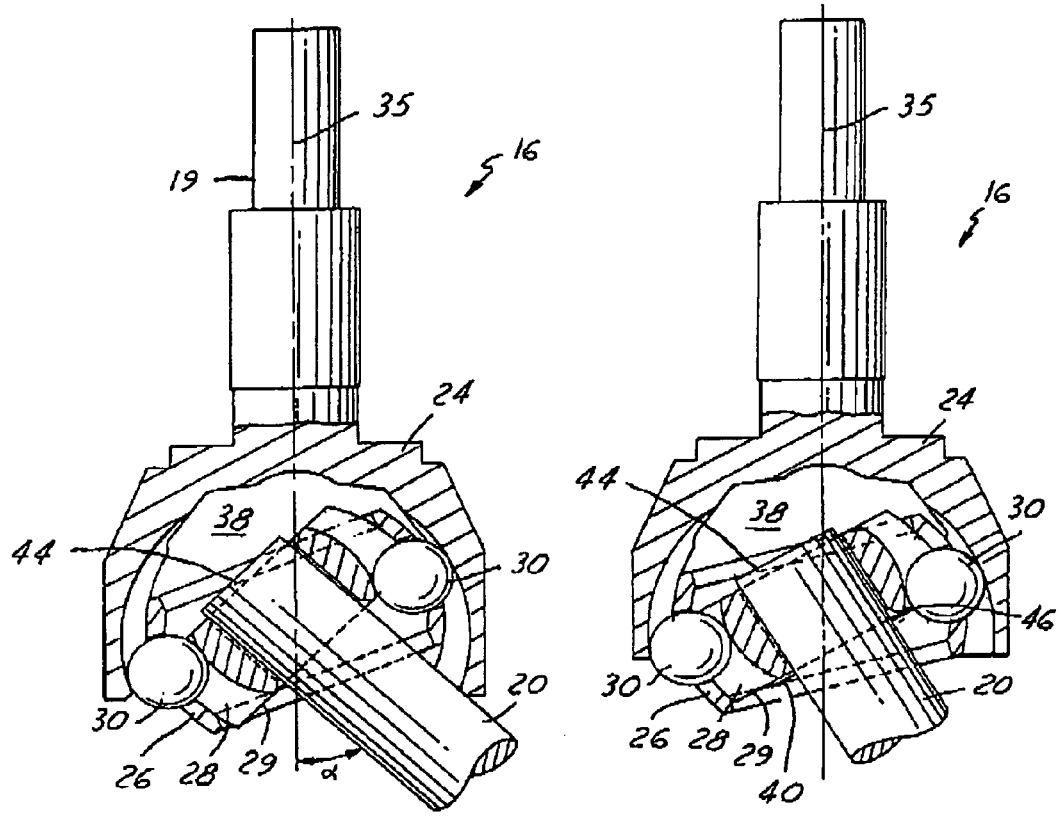
FIG. 2
"Prior Art"
FIG. 3
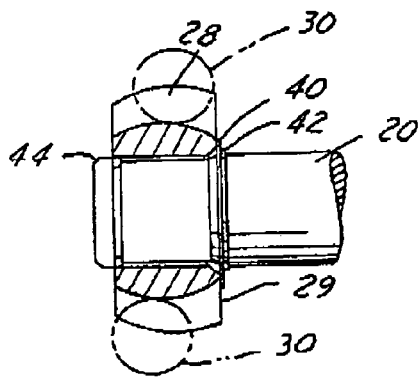
FIG. 4
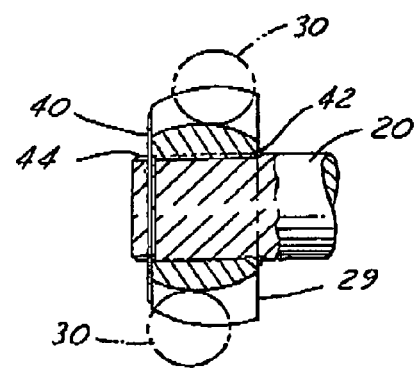
FIG. 5

DEVICE TO LIMIT THE AMOUNT OF ANGULAR DISPLACEMENT IN BALL-TYPE FIXED CV JOINTS

RELATED APPLICATION

This is a Continuation-In-Part of U.S. patent application Ser. No. 09/693,302, filed on Oct. 20, 2000.

TECHNICAL FIELD

The present invention relates generally to drive systems and more particularly to a device to limit the amount of angular displacement in ball-type fixed CV joints.

BACKGROUND

A key element in the driveline and drive train of a rear-wheel drive vehicle is a power transfer mechanism called a fixed axle. The fixed axle combines transmission and differential in a single unit.

In rear-wheel drive systems used on vehicles, the drive train is compacted into an engine/transmission/propshaft/fixed axle/driving axle "package" that provides torque force to the rear wheels.

The main purpose of the driving axles is to transmit engine torque from the final drive unit to the rear wheels. As part of the driving axle assembly, the constant velocity joints ("CV joints") are designed to operate at various angles to accommodate up and down movement of the rear wheels. Some CV joints also permit shaft length changes caused by up-and-down movement of the rear wheels and by fixed axle movement due to torque reaction.

The driving axle typically has CV joints at both "inboard" and "outboard" ends. The inboard CV joint generally consists of an outer race and stub shaft, an inner race, a cage, ball bearings, and a ball retainer. The outer race is called a "plunge" type because it has elongated grooves which allows the bearing cage and bearings to slide in and out as the front wheels go up and down. The inboard CV joint stub shaft is splined to the differential side gear.

The outboard CV joint generally consists of an outer race, a cage, an inner race, and ball bearings. The CV joint outer race stub shaft is splined to accommodate a splined hub that is pressed on and held by a staked nut. Typically, this is referred to as a ball-type fixed CV joint.

These CV joints use the rolling ball bearings in curved grooves to obtain uniform motion. The balls, which are the driving contact, move laterally as the joint rotates. This permits the point of driving contact between the two halves of the coupling to remain in a plane that bisects the angle between the two shafts.

One problem with an optimized small angle CV joint is that they may have the ability for the ball bearings to fall out if the CV joint is over articulated prior to assembly into a vehicle. Another similar problem could occur when the CV joint is disassembled. If one or more of the ball bearings is lost, the CV joint may not perform properly.

It is thus highly desirable to insert a device into the CV joint that would prevent the overarticulation of the CV joint that would in turn prevent the loss of ball bearings when the driveline is not fully assembled into a vehicle.

SUMMARY OF THE INVENTION

The present invention addresses the need to restrict the angular displacement of a ball-type CV joint designed for small angle applications.

One way to accomplish this is by adding an angle-limiting ring to the interconnecting shaft between the inner race an inner end of the interconnecting shaft prior to assembling the interconnecting shaft into the inner race of the ball-type CV joint.

Another preferred embodiment adds a snap ring to the interconnecting shaft such that the angle-limiting ring is captured between the inner race and snap ring. The snap ring allows the CV joint to be assembled or disassembled with the interconnecting shaft being installed in the inner race.

In another preferred embodiment, an angle-limiting ring is added further from the inner end of the interconnecting shaft. The interconnecting shaft is then moved to a position to allow the installation of the ball bearings. The interconnecting shaft is then repositioned and secured by adding a snap ring on the opposite side of the inner race.

The angle-limiting ring prevents the joint from articulating past a predetermined angle by coming into contact with the plurality of ball bearings at the predetermined angle after the assembly process, thereby restraining the ball bearings within the outer race.

Other objects and advantages of the present invention will become apparent upon considering the following detailed description and appended claims, and upon reference to the accompanying drawings.

BRIEF DESCRIPTION OF THE DRAWINGS

FIG. 2 is a perspective view of a fixed type CV joint according to the prior art;

FIG. 3 is a perspective view of a fixed ball-type CV joint having an angle-limiting ring according to one preferred embodiment of the present invention;

FIG. 4 is a perspective view of a fixed ball-type CV joint having an angle-limiting ring and a snap ring according to another preferred embodiment of the present invention; and FIG. 5 is a perspective view of a fixed ball-type CV joint having an angle-limiting ring and a snap ring in which an interconnecting shaft is positively retained within an inner race according to another preferred embodiment of the present invention.

DESCRIPTION OF THE PREFERRED EMBODIMENT(S)

Figure 1:
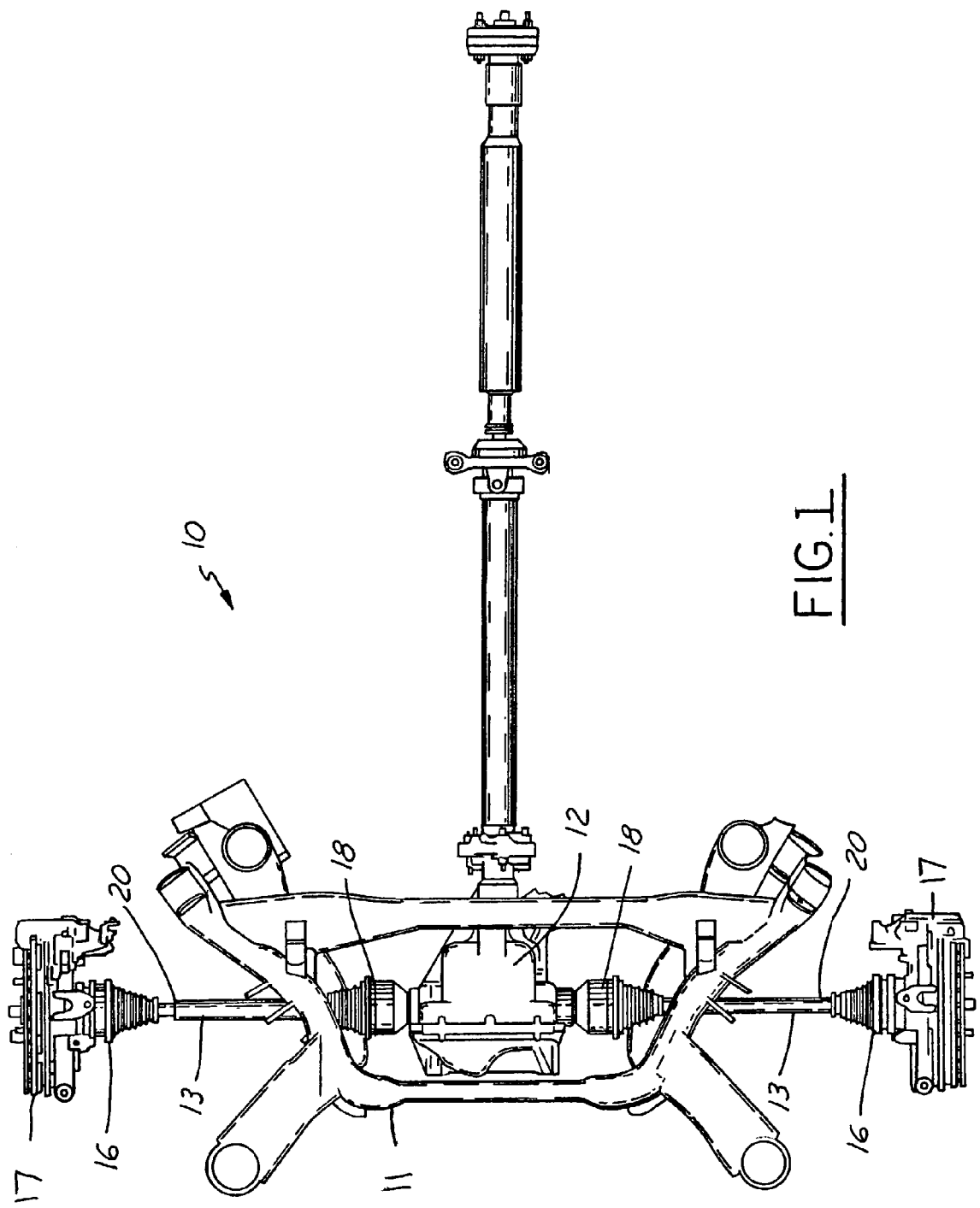
FIG. 1 is a perspective view of a rear wheel drive system.

Referring now to FIG. 1, a rear wheel drive system 10 is shown having a fixed axle 12 mounted to a vehicle sub-frame 11. The fixed axle 12 is also coupled to a pair of driving axles 13. Each driving axle 13 has as its major components an outer fixed ball-type CV joint assembly 16 and a plunging type inner CV joint assembly 18 coupled together with an interconnecting shaft 20. Each outer CV joint assembly 16 is also coupled to a hub assembly 17 in a method that is well known in the art.

Referring now to FIG. 2, the outer fixed ball-type CV joint assemblies 16 are Rzeppa-type fixed ball bearing CV joint assemblies and consist of an outer race 24, an inner race 28, a plurality of ball bearings 30, and a cage 26 to position the ball bearings 30. Typically, six ball bearings 30 are contained in the outer CV joint assembly 16. An interconnecting shaft 20 is contained within the inner region 38 of the outer race 24 and is coupled to the inner race 28. The hub assembly 17 is typically coupled to the outer race 24 through a stub axle 19. The inner race 28 and outer race 24 form a ball and socket arrangement when coupled.

To assemble the outer CV joint assembly 16 currently as in FIG. 2, first one assembles the inner race 28, cage 26 and ball bearings 30 within the outer race 24. Next an inner end 44 of the interconnecting shaft 20 is inserted within the inner race 28. The opposite end of the interconnecting shaft 20 is then coupled to the plunging type inner CV joint assembly 18. The interconnecting joint 20, once fully assembled within the rear wheel drive system 10, comes in contact with the outer race 24 at its inner end 44 at an angle $\alpha$ less than what is required to assemble the ball bearings 30, thereby positively retaining the ball bearings 30 between the inner race 28 and outer race 24 and within the cage 26. In FIG. 2, this angle $\alpha$ is forty-six degrees relative to a centerline 35 defined along the symmetrical length of the outer race 24 and extending through the stub axle 19.

In outer CV joint assemblies 16 of the prior art, as shown in FIG. 2, a possibility exists wherein at least one of the ball bearings 30 may fall out if the interconnecting shaft 20 is articulated beyond a predefined angle relative to the centerline 35 when the opposite end of the interconnecting shaft 20, and hence the drive axle 13, is not completely installed within its intended application. For example, this could occur when the drive axle 13 is being shipped in an uninstalled form or when the drive axle 13 is being prepared for assembly to the fixed axle 12 of the rear wheel drive system 10 as shown in FIG. 1. If one or more of the ball bearings 30 is lost, the joint assembly 16 may not perform properly during vehicle operation.

To prevent this occurrence, an angle-limiting ring 40 is added to the interconnecting shaft 20 prior to fully assembling of the drive axle 13 within its intended application. Three preferred embodiments having this angle-limiting ring 40 are shown below in FIGS. 3, 4 and 5, respectively.

In FIG. 3, the angle-limiting ring 40 is trapped on the interconnecting shaft 20 near the outer portion 29 of the inner race 28.

In FIG. 4, the angle-limiting ring 40 is added between the inner end 44 of the interconnecting shaft 20 and a snap ring 42 mounted on the interconnecting shaft 20. The snap ring 42 is in close proximity both the angle-limiting ring 40 and to the outer portion 29 of the inner race 28. The benefit of the snap ring 42 is that the CV joint assembly 16 can be assembled/disassembled with the interconnecting shaft 20 installed in the inner race 28.

In FIG. 5, the angle-limiting ring 40 is again added between an inner end 44 and the snap ring 42 of the interconnecting shaft 20 but in a position that is not closely coupled to an outer portion 29 of the inner race. The snap ring 42 is then installed onto the interconnecting shaft 20 near the outer portion 29 of the inner race 28.

The function of the angle-limiting ring 40, as stated above, is to prevent the loss of ball bearings 30 at any time when the drive axle 13 is not fully assembled into a vehicle. As the interconnecting shaft 20 is articulated to its maximum operating angle relative to centerline 35, which according to the preferred embodiments as shown in FIGS. 3-5 occurs at approximately thirty degrees, the edge 46 of the angle-limiting ring 40 contacts the ball bearings 30, thereby preventing further articulation beyond this point and retaining the ball bearings 30 within the CV joint assembly 16. Thus, the angle-limiting ring 40 prevents the CV joint assembly 16 from articulating any further than thirty degrees when the interconnecting shaft 20 is installed within the inner race 28 and the driving axle 13 is not installed into its intended application.

Of course, the maximum operating angle of the CV joint assembly 16 may vary between fifteen and forty degrees relative to the centerline 35 depending upon the design of the CV joint assembly 16 without changing the overall inventive purpose of adding an angle-limiting ring 40. For example, the maximum operating angle with the angle-limiting ring 40 could be thirty-three degrees relative to centerline 35 if slight modifications were made to the design of the preferred embodiments of FIGS. 3-5. These modifications could include modifying the height of the angle-limiting ring 40 or modifying the axial location of the angle-limiting ring 40 along the interconnecting shaft 20. Further, a combination of both height modification and axial location of the angle-limiting ring 40 could modify the maximum operating angle.

In addition, while the shape of the angle-limiting ring 40 is shown as being circular within FIGS. 3-5, the shape is not limited to a circular design. It is specifically contemplated that the shape could be scalloped or have some other irregular shape and still function to limit the angular displacement of the CV joint assembly 16 according to the present invention. Further, the ring 40 need not be a continuous ring. For example, the angle-limiting ring 40 could be C-shaped (split) and still function according to the present invention.

While the invention has been described in terms of preferred embodiments, it will be understood, of course, that the invention is not limited thereto since modifications may be made by those skilled in the art, particularly in light of the foregoing teachings.

What is claimed is:

1. A driving axle comprising:
   a plunging type inner constant velocity joint assembly;
   a fixed ball type outer constant velocity joint assembly, said fixed ball type outer constant velocity joint assembly having an outer race having an inner region, an inner race substantially coupled within said inner region, a plurality of ball bearings positioned between said outer race and said inner race, and a cage used to position each of said plurality of ball bearings;
   an interconnecting shaft coupled between said plunging type inner constant velocity joint assembly and said fixed ball type outer constant velocity joint assembly; and
   an angle-limiting ring coupled to said interconnecting shaft, wherein said angle-limiting ring is capable of limiting the articulation of said interconnecting shaft to a first angle relative to a centerline, wherein said first angle is approximately between fifteen and forty degrees relative to said centerline, said centerline being defined as extending longitudinally along a symmetrical length and through said outer race.

2. The driving axle of claim 1, wherein said first angle is approximately thirty degrees relative to said centerline.

3. The driving axle of claim 1, wherein said first angle is between approximately twenty-five and forty degrees relative to said centerline.

4. The driving axle of claim 1, wherein said angle-limiting ring has a first height relative to and extending from said interconnecting shaft, wherein the amount of articulation of said interconnecting shaft relative to said centerline is a function of said first height.

5. The driving axle of claim 4, wherein the amount of articulation of said interconnecting shaft relative to said centerline is also a function of the axial location of said angle-limiting ring along said interconnecting shaft.

6. The driving axle of claim 1 further comprising a snap ring coupled to said interconnecting shaft such that said angle-limiting ring is located between an inner end of said interconnecting shaft and said snap ring, wherein said snap ring is positioned to positively retain said interconnecting shaft within said inner race.

7. The driving axle of claim 6, wherein said angle-limiting ring is in close proximity with said snap ring on said interconnecting shaft and with an outer portion of said inner race.

8. The driving axle of claim 1, wherein the driving axle is contained within a rear wheel drive system.

9. A fixed ball type outer constant velocity joint assembly of a driving axle for use in a rear wheel drive system comprising:
   an outer race having an inner region;
   an inner race substantially coupled within said inner region;
   a plurality of ball bearings positioned between said outer race and said inner race;
   a cage used to position each of said plurality of ball bearings;
   an interconnecting shaft coupled to said inner race; and
   an angle-limiting ring coupled to said interconnecting shaft, wherein said angle-limiting ring is capable of limiting the articulation of said interconnecting shaft to a first angle relative to a centerline during assembly or disassembly of the driving axle from the rear wheel drive system, wherein said first angle is approximately between fifteen and forty degrees relative to said centerline, said centerline being defined as extending longitudinally along a symmetrical length and through said outer race.

10. The driving axle of claim 9, wherein said first angle is approximately thirty degrees relative to said centerline.

11. The driving axle of claim 9, wherein said first angle is between approximately twenty-five and forty degrees relative to said centerline.

12. The driving axle of claim 9, wherein said angle-limiting ring has a first height relative to and extending from said interconnecting shaft, wherein the amount of articulation of said interconnecting shaft relative to said centerline is a function of said first height.

13. The driving axle of claim 12, wherein the amount of articulation of said interconnecting shaft relative to said centerline is also a function of the axial location of said angle-limiting ring along said interconnecting shaft.

14. The driving axle of claim 9 further comprising a snap ring coupled to said interconnecting shaft such that said angle-limiting ring is located between an inner end of said interconnecting shaft and said snap ring, wherein said snap ring is positioned to positively retain said interconnecting shaft within said inner race.

15. The driving axle of claim 14, wherein said angle-limiting ring is in close proximity with said snap ring on said interconnecting shaft and with an outer portion of said inner race.

16. A fixed ball type outer constant velocity joint assembly of a driving axle for use in a rear wheel drive system comprising:
   a fixed ball type outer constant velocity joint having:
   an outer race having an inner region;
   an inner race substantially coupled within said inner region;
   a plurality of ball bearings positioned between said outer race and said inner race;
   a cage used to position each of said plurality of ball bearings;
   an interconnecting shaft coupled to said inner race; and
   an angle-limiting ring coupled to said interconnecting shaft, wherein said angle-limiting ring is capable of limiting the articulation of said interconnecting shaft to a first angle relative to a centerline during assembly or disassembly of the driving axle from the rear wheel drive system, wherein said first angle is approximately between fifteen and forty degrees relative to said centerline, said centerline being defined as extending longitudinally along a symmetrical length and through said outer race.

17. The driving axle of claim 16, wherein said first angle is approximately thirty degrees relative to said centerline.

18. The driving axle of claim 16, wherein said first angle is between approximately twenty-five and forty degrees relative to said centerline.

19. The driving axle of claim 16, wherein said angle-limiting ring has a first height relative to and extending from said interconnecting shaft, wherein the amount of articulation of said interconnecting shaft relative to said centerline is a function of said first height.

20. The driving axle of claim 19, wherein the amount of articulation of said interconnecting shaft relative to said centerline is also a function of the axial location of said angle-limiting ring along said interconnecting shaft.

21. The driving axle of claim 16 further comprising a snap ring coupled to said interconnecting shaft such that said angle-limiting ring is located between an inner end of said interconnecting shaft and said snap ring, wherein said snap ring is positioned to positively retain said interconnecting shaft within said inner race.

22. The driving axle of claim 21, wherein said angle-limiting ring is in close proximity with said snap ring on said interconnecting shaft and with an outer portion of said inner race.

\* \* \* \* \*